Aug. 16, 1966   D. R. HART ET AL   3,266,463
COW ANTI-KICKING APPLIANCE

Filed March 29, 1965   2 Sheets-Sheet 1

INVENTORS
DON REX HART
WILLARD L. PADGETT
BY Herbert Q. Winters
ATTORNEY

INVENTORS
DON REX HART
WILLARD L. PADGETT

United States Patent Office 3,266,463
Patented August 16, 1966

3,266,463
COW ANTI-KICKING APPLIANCE
Don Rex Hart, R.R. 1, and Willard L. Padgett, R.R. 2, both of Worthington, Ind.
Filed Mar. 29, 1965, Ser. No. 443,310
7 Claims. (Cl. 119—96)

This invention relates to a portable, cow anti-kicking device which may be shifted readily from stall to stall. Normally there is but quite a low percentage of cows in a dairy herd which are prone to kick when milked by hand or when the cups of a milking machine are applied to the cow's teats. Some cows will use their hind feet to try to kick off the cups even after having been applied and during the machine milking operation. But only one cow can create considerable injury.

The kick of a cow may be quite violent. A cow is capable of kicking forwardly, sidewise, and backwards. It has long been a custom to put a strap or a chain around the legs of a kicking cow to draw the legs closely together whereby neither leg may be lifted to raise a foot to kick. However, the kicker cow gets wise to this preventive means and will set up quite a bit of kicking to resist the application of the strap or chain.

Many dairymen, when milking cows by hand, or when stripping after removal of the machine cups, are exposed to the kicking of the cow, and this kicking when the man is stooped over or sitting on a stool may seriously injure the man. Consequently, some dairymen would push their head into the flank of the cow to have their head in the path of the lower end of the uppermost bone of the hind leg, thereby preventing the upward swing of that bone as is required to get the foot of that leg off the floor and carry it into the kicking action.

But that pressure of the head into the cow's flank had to be quite high and constant, or otherwise the cow would sense the lower pressure or none at all, and slyly get in the kick.

It is the primary purpose of our invention to provide an appliance by which a constant pressure of a selected degree may be applied against the cow's flank and simultaneously hold her to one side of the milking stall or parlor.

It is a further primary object of our invention to provide an exceedingly simple mechanism for the purpose indicated which may be simply dropped over a top rail of the stall and quickly adjusted to have the flank pressing member properly positioned and rocked into an operative position, all without mechanically modifying any part of the stall as will further be explained.

Again, it is a primary object of our invention to provide a structure whereby no tools are required to operate it or to rest it upon a stall member or remove it therefrom. Only three adjustments for a particular cow are required.

Figure 1:
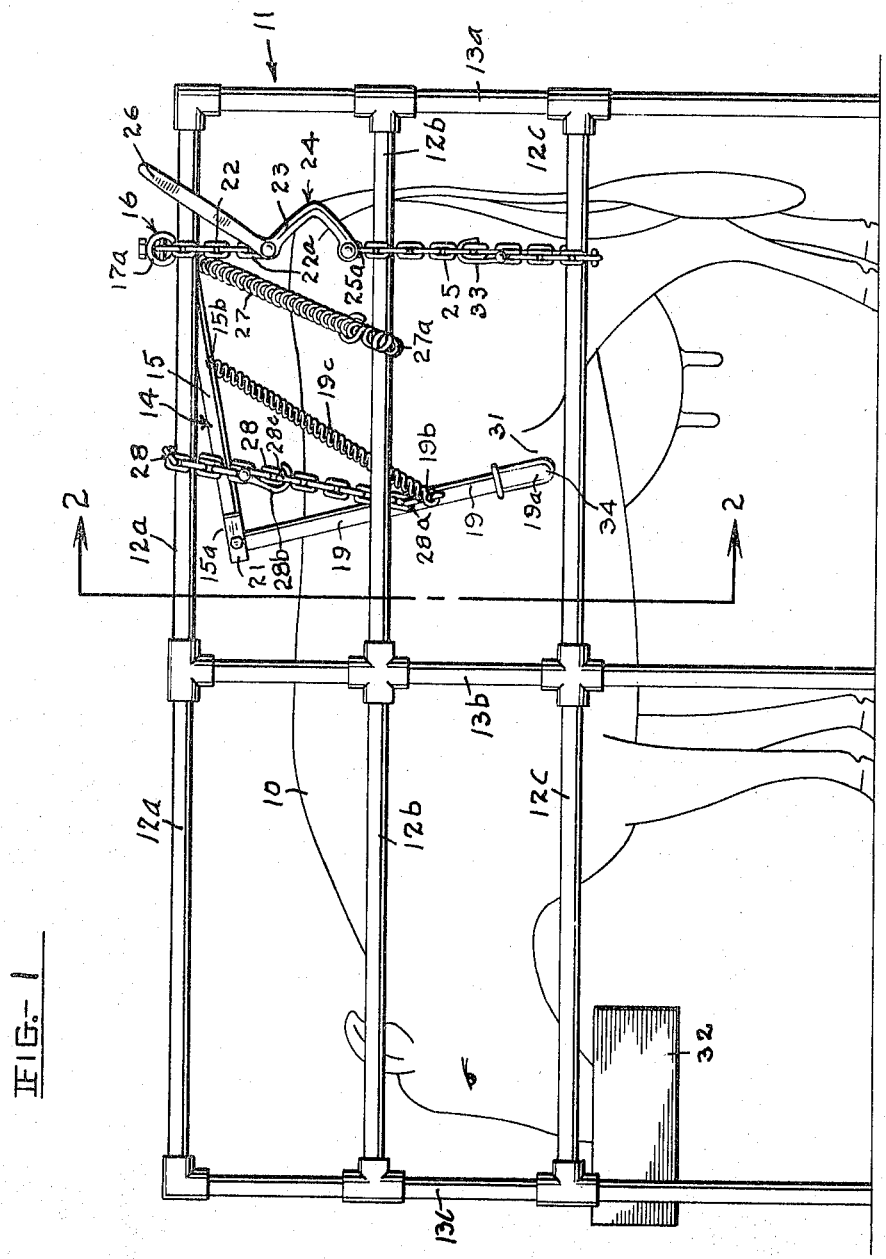
Figure 2:
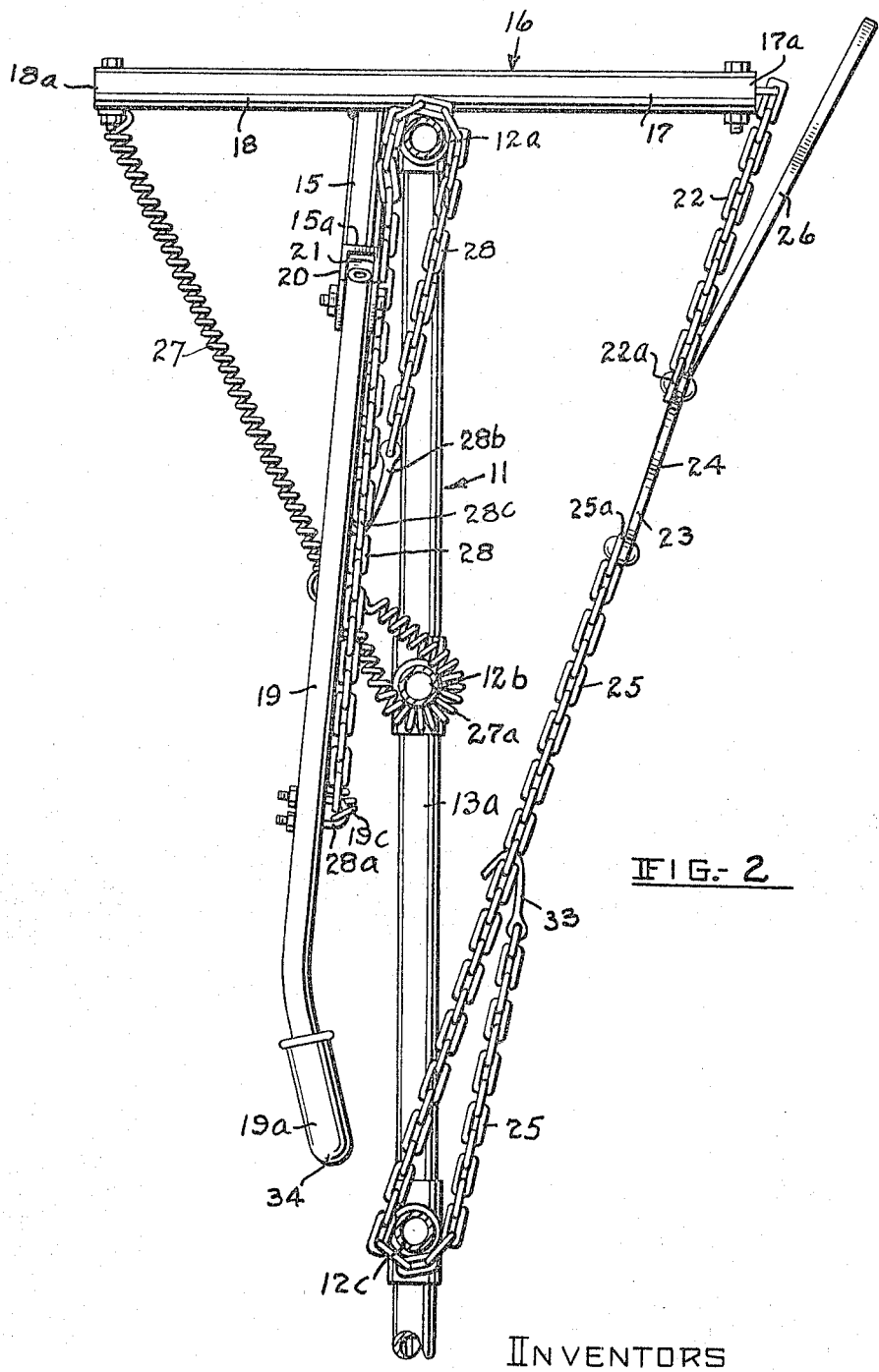

These and many other objects and advantages of the invention will become apparent in the following description of the one particular form of structure now best known to us, and as illustrated in the accompanying drawings, in which FIG. 1 is a more or less diagrammatic illustration in side elevation of a device ready to be applied to a cow; and FIG. 2 is a vertical section on the line 2—2 on FIG. 1.

A cow 10 is shown to be in a stall for milking. The stall is generally designated by the numeral 11, and is shown in a simplified form with a plurality of spaced apart side bars or pipes 12a, 12b and 12c, herein shown as three in number and fixed to posts 13a, 13b and 13c. The cow's udder will be located between the rear post 13a and the center post 13b.

The anti-kicking appliance generally designated by the numeral 14 has a major bar 15, to which is fixed across its rear end a short rest bar 16 with portions 17 and 18 of equal length extending approximately at right angles from the major bar 15. The major bar 15 is directed generally forwardly from the rest bar 16.

A swing bar 19 is hingedly connected to the forward end 15a of the major bar 15 between guide plates 20 and 21 to confine the swing bar 19 to permissible rocking in but one plane approximately at a right angle to the rest bar 16. Also, the swing bar 19 is limited in rearward swinging to some such position as indicated in FIG. 1. A chain 22 is fixed by one end to the outer end portion 17a of the rest bar 16 to hang downwardly to engage a take-up link 23 of a device generally designated by the numeral 24. A second chain 25 is engaged to an opposite end of the link 23 to hang downwardly therefrom. As a matter of convenience, this device 24 is positioned by the length of the chain 22 to be at a suitable height for easy manipulation by the dairyman. It is here shown as being between the horizontal bars 12a and 12b. A hand lever 26 is fixed to the link 23.

A coiled spring 27 is fixed by an upper end to the outer end 18a of the rest bar portion 18. The other end portion 27a of the spring 27 is carried around the stall bar 12b and hooked back into itself to give an effective length between the rest bar end 18a and the stall bar 12b whereby sufficient pull on that end 18a is set up to balance approximately the bar 16 and its hanging chains 22, 25, and take up 24 on the one side of the stall bar 12a against the bars 15 and 19 these last bars 15 and 19 being spaced a distance along the rest bar to lie normally against the stall bar 12a. The center of the length of the rest bar 16 is then approximately centered over the stall bar 12a, resting freely thereon.

A light gauge wire coil spring 19c is fixed by an upper end to the major bar 15 intermediate its ends, such as at 15b and by its lower end at 19b on the swing bar 19 intermediate the ends of the bar, as a means for supplying sufficient pull on the swing bar 19 to retain it that rearwardly rocked limit of swing as above indicated but permitting a yieldingly permissible forward rocking thereof for correct positioning of the swing bar lower end 19a for cow flank contact.

A chain 28 is secured by a lower end 28a to the swing bar 19 intermediate its ends, at a zone such as at the lower end 19b of the spring 19c. The location of this zone 19b may vary a few inches up and down the bar 19. This chain 28 is carried upwardly and over the top stall bar 12a and carried down to engage by a hook 28b into a link of the chain below the bar 12a. The chain 28 may be shifted at will along the bar 12a as may be desired.

To use the appliance, the rest bar portion 17 is placed to rest on the top bar 12a with the major bar 15 against the inside of the stall bar 12a and extending forwardly.

The spring 27 will tend to rock the swing bar 16 over the stall bar 12a into equilibrium upon sufficient tensioning thereof.

The downward swing of the major bar 15 and its carried swing bar 19 is determined by adjusting the effective length of the chain 28 by engaging the hook 28b, fixed in the end of the chain 28, in a selected link 28c of the chain 28. The interengagement of the hook 28b with a particular chain link will determine the height of the lower end portion 19a of the swing bar 19 above the stall floor 30 by rocking the bar 16 on its axis. This height of the bar end portion 19a is selected to be substantially at the height of that portion of the cow's flank 31 as is required to be pressed.

So far, the swing bar 19 will be hanging downwardly as indicated in FIGS. 1 and 2, to be adjacent the bars 12b and 12c. The chain 25 has its lower portion brought around under the stall bar 12c and thence upwardly and by a hook 33 engaged in a link of the chain 25 so as to have the link 23 in that position, FIGS. 1 and 2, to provide approximately an initial maximum spacing between the chain ends 22a and 25a.

In the positions of the elements so far described, the cow 10 is free to leave or enter the stall 11. After the cow is within the stall 10 and happily eating her feed in the feed box 32, the lever 26 is pulled down to have the chain end 25a come up toward the chain end 22a and thereby (as is well understood by those versed in the use of such boomers as the device 24 is) retain that overall chain reduced length relationship until the handle 26 is lifted.

In this manner the overall extent of the chains 22 and 25 is in effect shortened and the rest bar 16 is revolved about the top bar 12a to swing the bar end portion 19a away from the stall bar 12b and push it against and into the cow's flank 31. As indicated above, the proper, effective position of this portion 19a is obtained by three adjustments, namely, shifting the rest bar 16 along the bar 12a; adjusting the effective length of the chain 28; and adjusting the combined effective length of the chains 22 and 25 for the proper lateral rocking of the swing bar 19. It is preferred that a resilient cap 34 be fixed over the end of the swing bar to form its end 19a.

Thus it is to be seen that there are no permanent connections of any part of the device or appliance 14 with the stall members, and that the device is readily adjusted to a particular cow as to her height, and body length.

While we have shown and described our invention in the one precise embodiment, it is possible to make structural variations from that form without departing from the spirit of the invention, such, for example, as in the means for adjusting the effective lengths of the chains 22, 25 and 28, and in the means for elastically retaining the swing bar rocked back slightly under the major bar, and we therefore do not desire to be limited to that precise form beyond the limitations of the following claims.

We claim:

1. For holding a cow against kicking, the combination with stall-like upper and lower members for holding a cow, of means holding a cow against kicking comprising
    a T-bar comprising a rest bar riding over an upper one of said stall members and a major bar carried by and extending from said rest bar intermediate the rest bar ends;
    a swing bar rockably interconnected to said major bar at a zone spaced from said rest bar and having a free end portion;
    means limiting the rocking of said swing bar against rocking laterally of the major bar;
    an extensible spring interconnected to and between one outer end portion of said rest bar and a zone on said stall members;
    a first flexible member interconnected by an end portion to said swing bar intermediate its end portions;
    a second flexible member connected by one end to the end portion of said rest bar opposite from said one end portion;
    said rest bar opposite end portion being rested on an upper one of said stall members with said major bar extending along a cow-side of that stall member;
    said first flexible member being carried upwardly to engage with said upper stall member and be secured by a selected length between that stall member and said swing bar;
    said second flexible member being engaged to a lower stall member; and
    means holding said rest member by said second flexible manner in a selected rocked position to maintain said swing bar free end portion firmly pressed against the flank of a cow.

2. The structure of claim 1, in which there is a hook fixed to said second flexible member,
    said second flexible member being a chain;
    the chain is carried around said lower stall member and carried upwardly to have said hook engage the chain above that lower stall member to give an initial adjusted chain length between its engagement with said rest bar and said lower stall member; and there is
    means reducing the overall effective length of the initial chain length to rock said rest member to, in turn, rock said swing bar into said pressed condition.

3. The structure of claim 1, in which
    said major bar extends approximately perpendicularly from said rest bar;
    said rest bar opposite portion has a rounded bearing surface on said one stall member; and
    said rest bar is freely shiftably along said one stall member.

4. In a cow anti-kicking device to be carried by a fixed member at the side of the cow, comprising
    a T-bar comprising a rest bar and a major bar fixed by an end portion to the rest bar intermediate the ends thereof;
    a swing bar;
    hinge means between end portions of the major and swing bars limiting free swinging therebetween to be in a plane approximately normal to said rest bar, the swing bar normally dropping vertically from said major bar by gravity influence by a free end portion;
    said rest bar riding freely by one length extending from said major bar over an upper zone of said fixed member above said cow;
    spring means fixed between an intermediate zone of the swing bar and an intermediate portion of said major bar;
    said spring means yieldingly resisting rocking of said swing bar from under the major bar beyond an initially fixed angle;
    a second spring means interconnected with an outer end of said rest bar and a lower zone of said fixed member;
    a length of a flexible, linearly non-yieldingly member secured by one end portion to said swing bar at a zone intermediate its ends and extending by a sufficient length therefrom to engage said fixed member by selected lengths and thereby variably fix the maximum angle to which said swing member may rock to increase said angle in reference to said major bar; and
    means rotating said major bar by rocking said rest bar over said fixed member and thereby rocking the free end of the swing bar toward and against the flank of the cow.

5. The structure of claim 4, in which said means comprises a chain fixed to an opposite end portion of the rest bar and dropping downwardly to engage, by a selected chain length, said fixed member at a zone below said upper zone.

6. The structure of claim 5, in which
said chain has a hook at its free end portion;
each of said fixed member zones is determined by a fixed bar running longitudinally of the cow;
said chain free end portion is carried around under the lower fixed bar and back up to have the hook engage in the chain portion above the fixed bar thereby determining a position of said rest bar relative to rocking over the fixed bar.

7. The structure of claim 6 in which
said chain may be decreased in effective length to rock said rest bar;
said decreasing means comprising a rocker link inserted in the chain which upon being rocked will draw portions of the chain one toward the other.

References Cited by the Examiner

UNITED STATES PATENTS

| | | | |
|---|---|---|---|
| 2,904,005 | 9/1959 | Mielke et al. | 119—96 |
| 3,023,734 | 3/1962 | Schaub | 119—126 X |
| 3,058,447 | 10/1962 | Nuenschwander | 119—96 |
| 3,127,873 | 4/1964 | Guillaume | 119—147 |

SAMUEL KOREN, *Primary Examiner.*

ALDRICH F. MEDBERY, *Examiner.*